United States Patent
Schmitzek

(10) Patent No.: US 10,420,350 B2
(45) Date of Patent: Sep. 24, 2019

(54) DEVICE FOR MEASURING A SLAUGHTER ANIMAL BODY OBJECT

(71) Applicant: CSB-SYSTEM AG, Geilenkirchen (DE)

(72) Inventor: Peter Schmitzek, Geilenkirchen (DE)

(73) Assignee: CSB-System AG, Geilenkirchen (DE)

( * ) Notice: Subject to any disclaimer, the term of this patent is extended or adjusted under 35 U.S.C. 154(b) by 438 days.

(21) Appl. No.: 14/776,847

(22) PCT Filed: Mar. 14, 2014

(86) PCT No.: PCT/DE2014/000122
§ 371 (c)(1),
(2) Date: Sep. 15, 2015

(87) PCT Pub. No.: WO2014/139503
PCT Pub. Date: Sep. 18, 2014

(65) Prior Publication Data
US 2016/0029647 A1    Feb. 4, 2016

(30) Foreign Application Priority Data
Mar. 15, 2013    (DE) .................. 20 2013 002 483 U

(51) Int. Cl.
H04N 9/47        (2006.01)
H04N 7/18        (2006.01)
(Continued)

(52) U.S. Cl.
CPC ............. *A22B 5/007* (2013.01); *G01B 11/14* (2013.01); *G01B 11/22* (2013.01); *G01B 11/245* (2013.01);
(Continued)

(58) Field of Classification Search
CPC ....... G01B 11/00; G01B 11/245; G01B 11/28; G01B 11/22; G01B 11/14; G06K 9/52;
(Continued)

(56) References Cited

U.S. PATENT DOCUMENTS 5,349,378 A    9/1994 Maali
5,412,420 A    5/1995 Ellis
(Continued)

FOREIGN PATENT DOCUMENTS

DE    4408604 A1    12/1995
DE    19733216 C1   12/1998
(Continued)

OTHER PUBLICATIONS

Oprisescu S. et al., "Automatic 2D/3D ToF Image Fusion Using the Intrinsic Dimension", University Politehnica of Bucuresti, Imaging Processing and Analysis Laboratory, Bucuresti, Romania, 2012 IEEE, pp. 99-102.

*Primary Examiner* — Jeremiah C Hallenbeck-Huber
*Assistant Examiner* — Boubacar Abdou Tchoussou
(74) *Attorney, Agent, or Firm* — Laurence A. Greenberg; Werner H. Stemer; Ralph E. Locher

(57) ABSTRACT

A device for measuring a slaughter animal body object includes an image camera having an image-camera recording region, a depth camera having a depth-camera recording region, and an evaluation unit. The cameras are positioned in relation to one another by a positioning device in such a manner that the camera recording regions of the image camera and of the depth camera overlap in a common camera recording region at least in certain sections. The evaluation unit identifies measurement points in the common camera recording region and determines the distances thereof from one another.

6 Claims, 2 Drawing Sheets

(51) Int. Cl.
*A22B 5/00* (2006.01)
*G01B 11/14* (2006.01)
*G01B 11/245* (2006.01)
*G01B 11/22* (2006.01)
*G01B 11/28* (2006.01)
*H04N 9/04* (2006.01)
*G06T 7/50* (2017.01)

(52) U.S. Cl.
CPC ............... *G01B 11/28* (2013.01); *G06T 7/50* (2017.01); *H04N 9/045* (2013.01); *G06T 2207/30244* (2013.01)

(58) Field of Classification Search
CPC .......... H04N 9/045; G06T 2207/30244; A22B 5/007
See application file for complete search history.

(56) References Cited

U.S. PATENT DOCUMENTS

| | | | | |
|---|---|---|---|---|
| 7,348,963 B2* | 3/2008 | Bell | ..................... | A63F 13/02 345/156 |
| 7,850,512 B2 | 12/2010 | Eger | | |
| 7,853,046 B2 | 12/2010 | Sharony | | |
| 8,588,476 B1* | 11/2013 | Spicola, Jr. | .............. | G01G 9/00 348/61 |
| 8,744,168 B2* | 6/2014 | Chen | ................. | G06K 9/00362 382/154 |
| 9,167,800 B2* | 10/2015 | Spicola, Jr. | ......... | A01K 29/005 |
| 2003/0160970 A1* | 8/2003 | Basu | ................ | G01B 11/2518 356/601 |
| 2003/0231793 A1 | 12/2003 | Crampton | | |
| 2005/0257748 A1* | 11/2005 | Kriesel | ................ | A01K 11/008 119/51.02 |
| 2006/0139314 A1* | 6/2006 | Bell | ....................... | A63F 13/02 345/156 |
| 2006/0221250 A1* | 10/2006 | Rossbach | ................ | G01S 17/89 348/630 |
| 2008/0024768 A1* | 1/2008 | Babayoff | ............ | A61B 1/00009 356/73 |
| 2009/0067707 A1* | 3/2009 | Sim | ..................... | G06K 9/00208 382/154 |
| 2009/0324062 A1* | 12/2009 | Lim | ........................ | G06T 7/33 382/162 |
| 2010/0246970 A1* | 9/2010 | Springer | ............. | A01K 11/006 382/195 |
| 2011/0025834 A1* | 2/2011 | Chen | ....................... | H04N 7/18 348/77 |
| 2011/0044506 A1* | 2/2011 | Chen | ................. | G06K 9/00362 382/103 |
| 2011/0164792 A1* | 7/2011 | Yoon | .................. | G06K 9/00214 382/118 |
| 2011/0181702 A1* | 7/2011 | Hauger | .................. | A61B 3/102 348/46 |
| 2011/0188708 A1* | 8/2011 | Ahn | ........................ | G06K 9/00 382/106 |
| 2011/0286661 A1* | 11/2011 | Lee | .................... | H04N 13/0022 382/154 |
| 2014/0350410 A1* | 11/2014 | Axelsson | ............. | A01K 29/005 600/476 |
| 2015/0235351 A1* | 8/2015 | Mirbach | ................ | G06T 5/002 382/154 |

FOREIGN PATENT DOCUMENTS

| | | |
|---|---|---|
| DE | 19847232 A1 | 12/1999 |
| DE | 19936032 C1 | 7/2000 |
| DE | 10050836 A1 | 6/2002 |
| DE | 102004047773 A1 | 4/2006 |
| WO | 9200523 A1 | 1/1992 |
| WO | 2004012146 A1 | 2/2004 |

* cited by examiner

DEVICE FOR MEASURING A SLAUGHTER ANIMAL BODY OBJECT

The invention relates to a device for measuring a slaughter animal body object, particularly for measuring relevant structural areas at a surface of the slaughter animal body object.

BACKGROUND OF THE INVENTION

Field of the Invention

Optically recording a surface of a slaughter animal body object by means of an electronic camera is already known from the prior art. In these cases, the relevant surface is often a so-called cutting plane resulting from the cutting of a slaughter animal body object into two slaughter animal body halves.

Subsequently, the optical image recorded by the camera is photogrammetrically evaluated by means of an image analysis in which different types of tissue are detected and individual line segments and/or areas are calculated on the basis of contour tracks and distinctive reference points.

A procedure for evaluating slaughter animal body objects is revealed in DE 44 08 604 C2.

In the method described, an image of the slaughter animal body object to be analyzed is recorded in front of a blue background and the images obtained are digitalized and subsequently saved on a computer.

On the basis of previously defined color classifications and frequent color values, the outer contours of the slaughter animal body object are determined and specific image points are assigned to the respective types of tissue.

Moreover, the rear side of the slaughter animal body object is optically recorded for three-dimensional object determination, by applying a light cutting method, in order to evaluate the conformation class of the slaughter animal body object.

Furthermore, DE 197 33 216 C1, DE 198 47 232 C2 and DE 199 36 032 C1 describe the acquisition of characteristic measuring values and parameters in the cutting plane of a slaughter animal body object by means of an automatic image analysis and a subsequent photogrammetric evaluation for analysis and quality assessment purposes.

In order to obtain a correct and usable measurement result using known solutions, it is particularly necessary that the cutting plane is firstly as even as possible and secondly that it remains in an orthogonal orientation relevant to the camera plane during the complete measurement.

Normally, the slaughter animal body objects are aligned by moving them on guiding tubes relative to the camera plane, but a movement that is to some extent uneven can possibly cause vibrations, rotations or distortions around the vertical axis of the slaughter animal body object.

Due to the irregularities thus caused, the measurement accuracy of the line segments and areas to be determined at the cutting plane of the slaughter animal body object is impaired and therefore a correct measuring result cannot always be guaranteed.

Moreover, a defined distance between the slaughter animal body object and the recording cameras is required for the correct measurement of the slaughter animal body object. However, this distance can vary due to the undesired movements of the slaughter animal body object during its positioning and thus the accuracy of the measurement results can be additionally impaired.

Furthermore, an even cutting plane cannot always be ensured for each method with which the slaughter animal body object is processed. In addition to this, for slaughter animal body objects other than slaughter animal body halves the surface is, even idealized, not a plane but irregular, which is for example the case in ham.

Another disadvantage of the devices known so far is the fact that the exact positioning of the slaughter animal body objects, particularly if they are slaughter animal body halves, relevant to the corresponding camera is normally achieved by using a positioning device which inevitably comes into contact, at least in certain sections, with the slaughter animal body objects. As several slaughter animal body objects are usually positioned one after the other by the same positioning device and the positioning device cannot normally be cleaned after each slaughter animal body object, a hygiene risk can be caused, particularly if the slaughter animal body object is contaminated.

The publication DE 10 2004 047 773 A1 discloses a further possibility for determining physiological parameters of slaughter animal body objects that shall allow a market value determination, a calculation of meat and weight proportions and preferentially an exact definition of cutting points for an automatic cutting-up procedure.

In this case, a complete slaughter animal body object or parts thereof are registered by a tomographic method and the disc-shaped segments of the slaughter animal body object obtained in this way are combined to create a virtual model.

In the resulting model, compartments of the meat, fat and bone tissue are reproduced, enabling the determination of volumes, line segments and areas within the slaughter animal body object.

The solution described in this publication has in particular the disadvantage that the tomography method requires considerable technological effort and high costs and that due to the time-consuming procedure only a limited throughput of the slaughter animal body objects to be measured can be provided.

BRIEF SUMMARY OF THE INVENTION

Therefore, the object of the invention is to develop a device that allows the easy and cost-effective measurement of slaughter animal body objects and also guarantees high measurement accuracy.

This object is achieved by means of the features specified in claim 1. Preferred refinements result from the sub-claims.

Slaughter animal body objects according to the inventive solutions can be, in particular, complete slaughter animal body objects, slaughter animal body halves or parts thereof such as ham.

An inventive device for measuring a slaughter animal body object comprises an image camera comprising an image-camera recording range, and within the image-camera recording range a relevant section of the surface, in the case of a slaughter animal body half the slaughter animal body half on one cutting side, can be optically recorded.

In a stationary version of the inventive device, the slaughter animal body object is passed along the image camera by means of a transport system in such a manner that the relevant section of the surface, which in case of a slaughter animal body half is the cutting side of the slaughter animal body half, crosses the image-camera recording range.

The image-camera recording range is, for example, designed such that the complete surface on the cutting side of the slaughter animal body half can be recorded. However, depending on the application it is also possible that only one section of the cutting-side surface of the slaughter animal body half is recorded. The transport system mainly used for slaughter animal body halves consists of roller hooks and for other slaughter animal body object parts the use of band-conveyors can also be considered.

In every stationary version of the inventive device the slaughter animal body object is positioned in such a way that the relevant section of the surface, i.e. for a slaughter animal body half the cutting-side surface of the slaughter animal body half, is at least sufficiently turned towards the image camera to ensure a successful image is captured of the relevant sections on the relevant surface, i.e. for a slaughter animal body half the cutting-side surface.

According to the invention, the image camera is a 2D camera and within the image-camera recording range it enables the recording of light intensity values (g) of image points and the area coordinates (x, y) of the image points on the cutting-side surface of the slaughter animal body half.

The light intensity values can be recorded, for example, in a usual manner by determining gray scale values.

In this way it is for example possible to output a light gray scale value for fat tissue and a dark gray scale value for meat tissue contained within the cutting-side surface of the slaughter animal body half or within the relevant surface of another slaughter animal body object.

Preferentially, the image camera is aligned such that its center axis, hereinafter also referred to as a measurement standard, is positioned as far as possible in a right angle relevant to the movement axis of the slaughter animal body object.

In this arrangement, the center axis is the optical axis of the image camera, whereas the movement axis of the slaughter animal body object refers to the axis on which the slaughter animal body object is moved through the image-camera recording range.

Another feature is that the image camera according to this invention can provide the light intensity values of the image points and the area coordinates assigned to them as light intensity value data for transfer purposes.

Moreover, an invented embodiment has an evaluation unit that is connected with the image camera and records and processes the light intensity value data provided by the image camera.

According to the invention, the image camera and the evaluation unit can be connected with or without wires and this connection allows the transfer of the light intensity value data to the evaluation unit.

According to the invention, the device for measuring a slaughter animal body object is characterized by the fact that it additionally comprises a depth camera.

The depth camera has a depth camera recording range in which the relevant section of the surface, i.e. the surface on the cutting side of the slaughter animal body half in case of a slaughter animal body half, can also be recorded optically and in which the space coordinates of image points can be registered.

In the invented device, the space coordinates of the image points recorded are composed of their area coordinates (x, y) and a depth value (z).

In addition to this, the depth camera can provide the space coordinates of the image points as space coordinate data for transfer purposes.

Moreover, the invented device is characterized by the fact that it is equipped with a positioning device for positioning the depth camera relative to the image camera.

According to the invention, the positioning of the depth camera relative to the image camera is achieved in such a way that the depth camera recording range and the image camera recording range overlap in a common recording range at least in certain sections, and the image points to be evaluated by the evaluation unit are located in the common recording range.

Depending on the arrangement of the depth camera and the image camera in relation to each other, for example, a horizontal or a vertical arrangement, the depth camera recording range and the image-camera recording range can partly overlap either horizontally or vertically.

Preferentially, the recording ranges of the depth camera and the image camera and their positioning in relation to each other is defined such that the common recording range is as large as possible in order to utilize the resolution of the depth camera and image camera in the best possible way.

In the device of the present invention, the image points are recorded in real time and simultaneously by the depth camera and the image camera. Simultaneously means in this context that the slaughter animal body object is not or only slightly moved between the recording made by the image camera and that made by the depth camera so that an assignment of the area coordinates (x, y) of the image points recorded by the image camera and depth camera to each other remains possible.

The real time capability of the depth camera particularly results in a high image rate so that the depth camera is capable of recording space coordinates in the depth camera recording range simultaneously.

The device of the present invention is moreover characterized by the fact that the depth camera is also connected to the evaluation unit and the evaluation unit registers the space coordinates provided by the depth camera.

This connection allows the transfer of the space coordinates from the depth camera to the evaluation unit and can also be designed with or without wires.

According to the invention, the evaluation unit can assign the light intensity value data provided by the image camera to the space coordinate data of image points provided by the depth camera if they have common area coordinates (x, y). By means of the data delivered by the image camera and depth camera, image points are provided in the common recording range for which both the area coordinates (x, y) and the light intensity value (g) and the depth value (z) are registered, and the area coordinates from the light intensity value data and the area coordinates from the space coordinate data are identical.

It is particularly advantageous if the assigned light intensity value and space coordinate data are provided as data tuples (x, y, z, g).

Furthermore, the evaluation unit according to this invention is capable of identifying defined measurement points on the surface of the slaughter animal body half from the light intensity value data of the image points provided by the image camera. The identification of measurement points means that characteristic structures on the surface of the slaughter animal body object, for example muscles, fat tissue or bones, are detected by the evaluation unit by applying image analysis and object identification processes. For this purpose, different tissue sections are computationally detected and selected on the basis of the differences in light intensity value in order to determine the contours of muscles, fat and bones by means of a contour-tracking algorithm.

On the basis of these characteristic structures, points are defined, the position of which in relation to each other makes it possible to reach conclusions about the quantities and qualities of the slaughter animal body object. The area coordinates of these points are determined as measurement points by the evaluation unit and form the basis for further measurements.

The space coordinate data of the data tuple of a first measurement point and the space coordinate data of the data tuple of a second measurement point make it possible to determine the distance from one measurement point to the other in the space.

Depending on the requirement, this method makes it possible to determine the spatial Euclidian distance of the measurement points to one another or their distance from one other in the relevant section of the surface, i.e. the cutting-side surface of the slaughter animal body object surface in case of a slaughter animal body half, and the distances of the measurement points on the relevant or cutting-side surface are determined by an integration of the spatial distances of sufficiently small partial distances of the total distance.

Moreover, in this way it is also possible to determine areas within the relevant sections of the surface and of the cutting-side surface in case of slaughter animal body halves via an integration of sufficiently small, spatially exactly calculated partial areas, if a sufficient number of measurement points is provided.

In both cases, measurement errors due to uneven or bent surface areas can be successfully avoided by such a procedure. Depending on the complexity, for example of the cutting-side surface of a slaughter animal body half, it can further be useful to smooth the optically recorded surface locally to improve the measurement accuracy, in particular by involving the depth values of the pixel neighbourhood, and to calculate the distance values of the measuring points on the smoothed surface in the sense of a model with an ideal cutting-side surface.

For a sufficient number of relevant measurement points it is also possible to perform area measurements in addition to line segment measurements, and as a result statements can be made regarding the composition of the slaughter animal body object, for example lean meat, fat tissue and bone proportions, about the position of organic structures, etc. Quantitative and qualitative classification statements and cutting decisions can be derived from this information.

Depending on the resolution of the depth and image camera, the image points of the cutting-side surface of the slaughter animal body half are present in a defined number of pixels. The image data are combined by means of the evaluation unit, even for different resolutions of the depth camera and the image camera, in such a way that, apart from the area coordinates, the light intensity value and the depth value are provided for each pixel by the combined light intensity value data and space coordinate data.

Preferentially, the device also comprises units for illuminating the slaughter animal body object, and the light color is advantageously selected such that a good image point recording will be possible.

Thus, the device according to the invention allows the measurement of the slaughter animal body object at relevant sections of the surface, i.e. on the cutting-side surface for a slaughter animal body half, and provides considerable advantages compared to the state of the art, which are particularly obvious in the measurement of slaughter animal body halves.

One advantage is the high measurement accuracy because possibly existing irregularities in distance and angle, for example due to the positioning of the slaughter animal body half, and a possibly uneven cutting-side surface, can be corrected by the registered depth value.

Simultaneously, the components used in the invention make it possible to keep the provision and application costs of such a device low and ensure a high throughput of slaughter animal body objects to be measured.

Moreover, due to the inclusion of the individual depth value in the present invention, it is not absolutely necessary to maintain a default distance or a default angle of the slaughter animal body half relative to the device, because the distance information can already be provided by the depth value. Thus, additional equipment otherwise required for the exact positioning of the slaughter animal body half or for the correction of unevenness is no longer necessary. Consequently, the provision and operating costs of a device according to this invention are comparatively low.

Furthermore, measurement can be carried out without any contact with the slaughter animal body object and thus hygiene risks caused by additional equipment known from the prior art for the positioning of slaughter animal body halves are avoided and additional hygiene measures are not required.

The advantages described also apply accordingly to the measurement of other slaughter animal body objects which can, for example, be transported on a conveyor belt. It is true that the problem of uncontrolled movements does not exist if conveyor belts are used. Nevertheless, the invented solution offers a particular advantage even for these cases because the positioning of the slaughter animal body object relative to the conveyor belt, particularly transversely to the length of the conveyor belt, can be inexact and the device of the present invention already provides the distance information through the depth value. The distance data not only provide information about the position of the slaughter animal body object relative to the image camera but also relative to the conveyor belt. As the motion and positioning of the conveyor belt can be exactly controlled, it is also possible, in case of further transport to a down-stream station, to pre-determine a position of the slaughter animal body object relative to the elements of such a station, for example a cutting robot, and to control the other element according to the known position without requiring new data to be recorded.

Thus, the immanent inclusion of the depth values leads to a further specific advantage in that the device according to this invention can be used not only as a stationary version, i.e. with a defined distance and angle to the slaughter animal body object, but also as a mobile version, for example as a hand-held unit. Thus, it is also possible to perform control or reference measurements to check, for example, the functional efficiency and precision of other measurement systems.

In a particularly advantageous further embodiment of the invention, the image camera is a chromaticity camera.

The use of a chromaticity camera enables the operator to register the light intensity values separately according to individual color channels, specifically Red, Green and Blue (RGB), and to provide the light intensity values separated according to color channels in the light intensity value data and to transfer them to the evaluation unit. The light intensity values can then be used according to the color channels for the image analysis and thus contours of structures can be better identified.

In this way, the measurement accuracy achieved by the device of the present invention can be additionally optimized.

Moreover, in a further advantageous embodiment of the invention, the depth value obtained from the individually determined space coordinates is used for the identification of measurement points on the relevant surface of a slaughter animal body object.

Thus, the measurement points can be better identified by including the depth value information, in particular for an uneven cutting-side surface of a slaughter animal body half. This is particularly the case if a characteristic structure, for example at the transition of a cutting plane into the abdomen, can be better detected by the depth information than by the light intensity value data.

In this case, the recordable depth value takes on a dual function by providing the space coordinates of the measurement points identified from the light intensity value data of the image points and, in addition to this, by allowing or at least supporting the foregoing identification of the measurement points, in particular on the cutting-side surface of the slaughter animal body half.

In a particular manner, the depth information can also be used to distinguish the slaughter animal body object from the background and thus to define its contour. Depth values that lie outside a defined range, especially depth values above a defined range, are then assigned to the background per se by an evaluation algorithm without requiring the additional inclusion of the light intensity value data. This method makes it possible to dispense with background walls that are normally used in the prior art.

Moreover, as a further advantage the depth information can also be used if several slaughter animal body objects are positioned very close to each other, possibly even in contact with each other, for example in boxes. In such a case, a separation of the slaughter animal body objects from each other will be very problematic if only the light intensity values of the image points are applied, even if the image camera is a chromaticity camera. By means of the depth information, the recesses and distortions at the transition points between the slaughter animal objects can be detected and a separation can be provided on the basis of these detected recesses and distortions.

A further advantageous embodiment addresses a frequently occurring problem which is that the real surface shape and an ideal model-like shape of the slaughter animal body object are not identical. In slaughter animal body halves the cutting-side surface, for example, is an exact plane in the model-like ideal shape. The model-like distances of measuring points are based on the model-like ideal shape. The deviation of the real surface shape from the model-like ideal shape leads to inaccuracy in the significance of statements about the distances of the measurement points in the space based on the real surface shape.

It is one of the advantages of the invention that the distance information, i.e. the z-value of the space coordinates, provided in any case by the depth camera, can also be used to solve this problem.

Provided the areas with deviations are known, in particular if they are always at the same location due to anatomical or technical conditions, the depth values of points within these areas may be excluded or weighted less a priori for the creation of the model-like ideal surface. If they are not known, such points are detected from a plurality of points which show a deviation greater than a defined value from the ideal model defined by most of the other points and which on this basis are excluded or weighted less. Known methods, such as RANSAC, can be used for the model adjustment and outlier detection.

On the basis of the model-like ideal surface shape created in this way, in the case of a slaughter animal body half of the plane, the space coordinates of the measurement points determined are projected onto the ideal model surface according to the previous model-related knowledge. Based on the space coordinates provided in this manner, the distance of the measurement points in the space are then determined.

In a further advantageous embodiment of the invention, the depth camera is a TOF (Time-of-flight) camera.

A TOF camera allows in a manner known per se to determine a distance between itself and a recorded object by applying a transit time technique.

In this method, the recorded object is illuminated by a light pulse and the camera determines for each illuminated image point the time which the light needs to reach the object and from the object back to the camera.

The use of a TOF camera offers several advantages.

First, TOF cameras normally have a simple design and therefore they can be provided at relatively low costs.

Secondly, high image rates can be achieved by TOF cameras, because the complete object is recorded in one image in a very short time. Therefore, TOF cameras are particularly useful for the real-time application intended by the invention.

Furthermore, the detection of specific image points, which is for example required for depth measurements by means of projection or a stereo-camera system, is no longer necessary.

In other further embodiments, stereo camera systems, stereo camera systems with projection and evaluation of a dot pattern, monoscopic camera systems with projection and evaluation of a dot pattern, in which the depth information is obtained by shifting the dots of the dot pattern, can be used.

BRIEF DESCRIPTION OF THE SEVERAL VIEWS OF THE DRAWING

In the following, the invention is explained as an embodiment in more detail by means of the following figures. They show.

DESCRIPTION OF THE INVENTION

Figure 1:
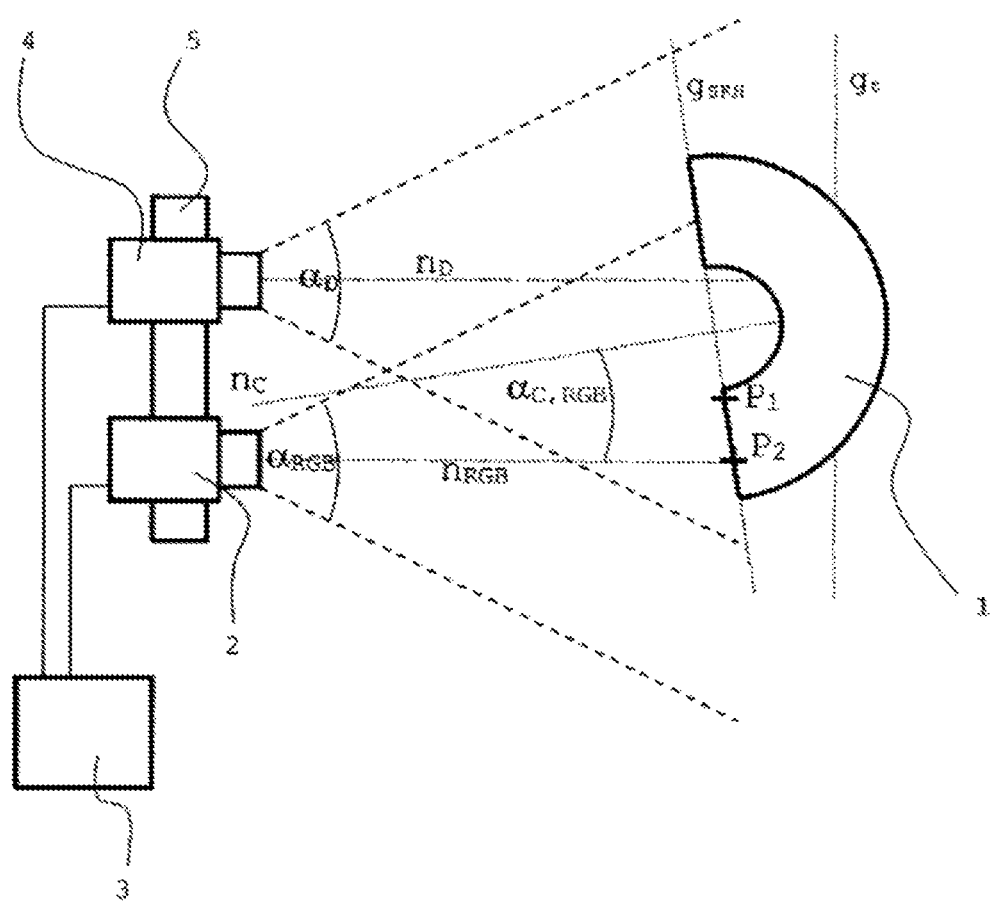
FIG. 1 a schematic drawing

This embodiment is a device for measuring a slaughter animal body object in the form of a slaughter animal body half 1.

An invented device for measuring a slaughter animal body half 1 comprises an image camera 2 and a depth camera 4.

The image camera 2 is an RGB camera and has an image-recording range with a recording angle $\alpha_{RGB}$.

Within the image recording range, a cutting-side surface of the slaughter animal body half 1, here illustrated by the plane axis $g_{SKH}$ of the cutting-side surface, can be at least partially recorded by the image camera 2.

Within the image recording range, the image camera 2 can additionally record light intensity values (g) of image points and their area coordinates (x, y) on the cutting-side surface of the slaughter animal body half 1.

The recorded light intensity value data and area coordinates are combined to light intensity value data (x, y, g) and provided for transfer purposes by the image camera 2.

According to the invention, the light intensity value data are transferred to an evaluation unit 3 which is connected to the image camera 2 and registers and further processes the transferred light intensity value data.

The depth camera 4 intended by the invention is designed as a TOF (Time-of-flight) camera and has a depth camera recording range with a recording angle $\alpha_D$.

Within the depth camera recording range, the cutting-side surface of the slaughter animal body half 1 can also be at least partially recorded.

The depth camera 4 can simultaneously record space coordinates of image points on the cutting-side surface of the slaughter animal body half 1, and the space coordinates always consist of the area coordinates (x, y) and a depth value (z).

The space coordinates are provided by the depth camera 4 as space coordinate data (x, y, z) and are also transferred to the evaluation unit 3 which is also connected to the depth camera 4.

In the invention, the image camera 2 and the depth camera 4 are positioned relative to each other by a positioning device 5 in such a way that the image camera recording range and the depth camera recording range overlap at least in certain sections in a common recording range that is as large as possible.

The evaluation unit 3 of the present invention is capable of using the light intensity value data of the image camera 2 for identifying and defining discrete measurement points $P_1$, $P_2$ on the cutting-side surface of the slaughter animal body half 1.

In this way, an object detection of defined areas on the cutting-side surface of the slaughter animal body half 1 is made possible such that, for example, image points with high light intensity value data are assigned to fat tissue segments and image points with low light intensity value data are assigned to meat tissue segments. On the basis of the different light intensity value data a concrete differentiation between light-intensive and low-light image points and thus a differentiation between fat and meat tissue sections can then be carried out automatically.

The measurement points $P_1$ and $P_2$ are subsequently determined on the basis of this information so that they mark, for example, the outer edges of a fat tissue section.

Furthermore, in the invention the evaluation unit 3 can assign the light intensity value data provided by the image camera 2 and the space coordinate data provided by the depth camera 4 to each other via matching area coordinates and thus determine the appropriate depth value for each measurement point $P_1$, $P_2$.

In addition to this, the evaluation unit 3 makes it possible to combine the light intensity value data and the space coordinates to data tuples, whereby one data tuple can always be assigned to each measurement point $P_1$, $P_2$, and it is particularly advantageous that on the basis of the data tuples of the measurement points $P_1$, $P_2$ the spatial distance between them can be determined.

Thus, a particular technical advantage is provided by the measurement of the cutting-side surface of the slaughter animal body half 1 and by an object detection of relevant areas in the surface, for which the otherwise usual two-dimensional area information is complemented by the depth value to enable a three-dimensional object detection on the cutting-side surface of the slaughter animal body half.

In an inventive embodiment, the image camera 2 and the depth camera 4 are positioned in relation to each other in such a way that the corresponding recording ranges of the cameras overlap in a common recording range, at least in certain sections.

The image points are recorded in the common recording range in real time, which means that no or only a slight relative movement of the slaughter animal body half 1 relative to the device occurs between the recording of the specific image point by the image camera 2 and the recording of the same image point by the depth camera 4.

The image camera 2 and the depth camera 4 are positioned in the invented device such that the measurement standard $n_{RGB}$ of the image camera and the measurement standard $n_D$ of the depth camera are parallel to each other as far as possible, and a distance d arises between the cameras such that a sufficiently large common recording range is provided.

During the measurement procedure, the slaughter animal body half 1 is passed along the device on a movement axis $g_t$ by a transport unit, here designed as a tube track (not shown).

Thanks to the inclusion of the individual depth values it is particularly advantageous that it is not necessary to align the slaughter animal body half 1 precisely relative to the device during the measurement.

In fact, it is sufficient if the cutting-side surface of the slaughter animal body half 1 faces the image camera 2 and the depth camera 4 so that the relevant measurement points $P_1$, $P_2$ can be clearly identified and a sufficiently high resolution of image points is provided.

Compared with solutions known so far, the device according to this invention therefore offers the technological advantages that a very exact measurement of the cutting-side surface of the slaughter animal body half 1 and an exact object detection of relevant surface areas, such as fat, meat or bone tissue, can be carried out automatically and that, simultaneously, by including the depth values, possible measurement irregularities caused by an imprecise positioning of the slaughter animal body half 1 or by an existing unevenness of the cutting-side surface of the slaughter animal body half 1 can be compensated.

Figure 2:
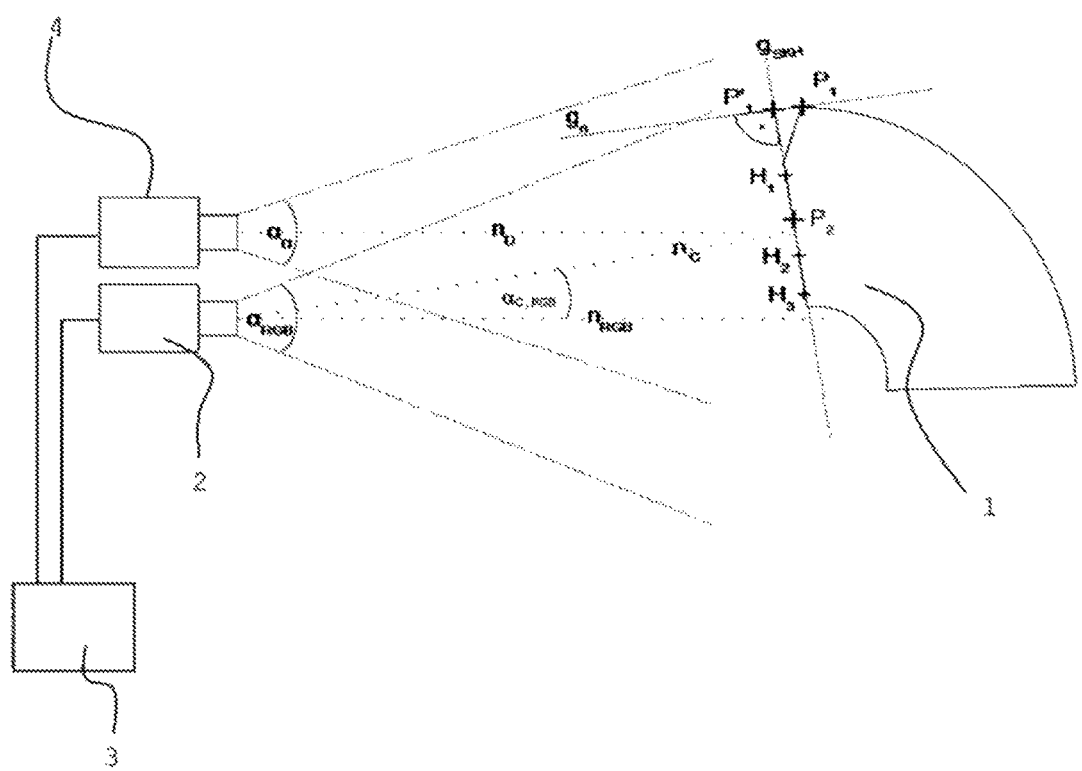
FIG. 2 a schematic drawing with an ideal surface.

In FIG. 2 a further particularly advantageous embodiment of the invention is shown and, for simplification purposes, the positioning device and the movement axis of the slaughter animal body half 1 are not illustrated anew.

The slaughter animal body half 1 shown in FIG. 2 has a real surface shape that does not match a model-like ideal shape that is supposed to be a plane in the embodiment. The deviation of the real surface shape is demonstrated by the position of the first measurement point $P_1$. The determined measurement point $P_1$ is therefore not positioned on the model-like ideal shape of the cutting-side surface, illustrated by a plane axis $g_{SKH}$ in FIG. 2.

Due to the deviation of the determined measurement point $P_1$ from the idealized cutting-side plane, a deviating distance of the measurement points in the space would arise on the basis of the real surface shape.

In order to reduce the inaccuracy caused by the measurement points deviating from the ideal plane, the further embodiment shown in FIG. 2 is designed such that several representative auxiliary points, here $H_1$ to $H_3$, are determined on the cutting-side surface of the slaughter animal body half 1 in a first step. In a next step, an idealized cutting-side plane, illustrated by the straight line $g_{SKH}$, is defined on the basis of these auxiliary points $H_1$ to $H_3$.

Afterwards, the deviating measurement point $P_1$ is projected onto the idealized cutting-side plane and thus the projected measurement point $P_1'$ is created. The z-value, which corresponds to the z-value of the idealized cutting-side plane in the point of the corresponding area coordinates, is assigned to the measurement point $P_1$.

A distance for the further use within a line segment and/or area measurement can now be determined between the projected measurement point $P_1'$ and a further determined measurement point $P_2$ and thus a higher accuracy can be achieved.

LIST OF REFERENCE NUMERALS 1 slaughter animal body half
2 image camera
3 evaluation unit
4 depth camera
$n_{RGB}$ measurement standard of image camera
$n_D$ measurement standard of depth camera
$n_C$ measurement standard of slaughter animal body half
$g_{SKH}$ plane axis of slaughter animal body half
$g_t$ movement axis of slaughter animal body half
$g_n$ projection axis of first measurement point
$\alpha_{RGB}$ recording angle of image camera
$\alpha_D$ recording angle of depth camera
$\alpha_{C,RGB}$ angle between slaughter animal body half and image camera
$P_1$ first measurement point
$P_2$ second measurement point
$P_1'$ projected first measurement point on ideal surface
$H_1$ first auxiliary point
$H_2$ second auxiliary point
$H_3$ third auxiliary point

The invention claimed is:

1. A device for measuring a slaughter animal body object, the device comprising:
an image camera having an image-camera recording range for optically recording a section of a surface of a slaughter animal body object and for recording light intensity values (g) of image points and area coordinates (x, y) of the image points, the light intensity values (g) and the area coordinates (x, y) being provided as light intensity value data on the surface of the slaughter body for transfer purposes;
an evaluator connected to said image camera, said evaluator registering the light intensity value data provided by the image camera and identifying measurement points on the surface of the slaughter body from the light intensity value data;
a depth camera having a depth-camera recording range for optically recording the section of the surface of the slaughter animal body object and for recording space coordinates (x, y, z) of image points within the depth-camera recording range, the space coordinates (x, y, z) including area coordinates (x, y) and a depth value (z), and the space coordinates (x, y, z) being provided as space coordinate data for transfer purposes;
a positioner for positioning said depth camera relative to said image camera, said positioner positioning said image camera and said depth camera in relation to one another to have the depth-camera recording range and the image-camera recording range overlap, at least in certain sections, in a common camera recording range;
said depth camera being connected with said evaluator, said evaluator registering the space coordinates (x, y, z), said evaluator assigning the light intensity value data (x, y, g) and the space coordinate data (x, y, z) on the basis of matching area coordinates (x, y), the assigned light intensity value data and space coordinate data being provided as four item data tuples, the four item data tuples including area coordinates (x, y), depth value (z) and light intensity value (g), said evaluator identifying, based on computational detection and selection of different tissue sections using the differences in light intensity value, a first measurement point and a second measurement point of the surface of the slaughter animal body object from the light intensity value data of image points provided by the image camera, and said evaluator determining, on the basis of the space coordinate data (x, y, z) of a first four item data tuple of a first image point of the first measurement point and on the basis of the space coordinate data (x, y, z) of a second four item data tuple of a second image point of the second measurement point, a spatial distance between the first measurement point and the second measurement point.

2. The device according to claim 1, wherein the slaughter animal body object is a slaughter animal body half which has a cutting side, the section of the surface is the surface of the cutting side, and the surface of the cutting side of the slaughter animal body half is optically captured both by the image camera recording range and the depth camera recording range.

3. The device according to claim 1, wherein said image camera is a chromaticity camera, the light intensity values are registered separately according to color channels, and the light intensity values are provided separately according to color channels in the light intensity value data.

4. The device according to claim 1, wherein the depth value from the individually determined space coordinates (x, y, z) is used for identifying a measurement point at the section of the surface of the slaughter animal body object.

5. The device according to claim 1, wherein the depth value from the individually determined space coordinates (x, y, z) of a plurality of points on the section of the surface of the slaughter animal body object is used for determining a model ideal surface, and the spatial distance of identified measurement points is determined on the basis of the depth value (z) that corresponds to a model ideal surface shape.

6. The device according to claim 1, wherein the depth camera is a TOF (time-of-flight) camera.

* * * * *